US012485070B2

(12) United States Patent
Shaanti

(10) Patent No.: US 12,485,070 B2
(45) Date of Patent: Dec. 2, 2025

(54) ACOUSTIC INSTRUMENT SOOTHER WITH VOCAL AND MUSIC NOTATION LESSONS

(71) Applicant: Rohan Shaanti, Etobicoke (CA)

(72) Inventor: Rohan Shaanti, Etobicoke (CA)

( * ) Notice: Subject to any disclaimer, the term of this patent is extended or adjusted under 35 U.S.C. 154(b) by 95 days.

(21) Appl. No.: 18/589,663

(22) Filed: Feb. 28, 2024

(65) Prior Publication Data

US 2024/0285475 A1 Aug. 29, 2024

Related U.S. Application Data

(60) Provisional application No. 63/449,042, filed on Feb. 28, 2023.

(51) Int. Cl.

| | |
|---|---|
| ***A61J 17/00*** | (2006.01) |
| ***A61J 17/02*** | (2006.01) |
| ***G09B 15/00*** | (2006.01) |
| ***G10D 7/14*** | (2020.01) |

(52) U.S. Cl.

CPC ......... *A61J 17/1011* (2020.05); *A61J 17/001* (2015.05); *A61J 17/02* (2013.01); *A61J 17/1115* (2020.05); *G09B 15/00* (2013.01); *G10D 7/14* (2020.02)

(58) Field of Classification Search

CPC .......... A61J 17/00; A61J 17/001; A61J 17/02; A61J 17/10; A61J 17/101; A61J 17/1011; A61J 17/109; A61J 17/1115

See application file for complete search history.

(56) References Cited

U.S. PATENT DOCUMENTS 10,172,766 B2 * 1/2019 Shaanti ................ A61J 17/1011

* cited by examiner

*Primary Examiner* — Todd J Scherbel

(74) *Attorney, Agent, or Firm* — Nasser Ashgriz; UIPatent Inc.

(57) ABSTRACT

An acoustic instrument soother for infants and young children, combining a pacifier, a teether, and a mouthguard with a harmonica to generate sound. The device incorporates non-electronic musical elements, aiming to soothe and entertain young users while fostering early musical education. The harmonica component features multiple mouthpieces for sound production, activated by the user's inhalation and exhalation. Through the integration of music notation symbols engraved on its surface, the device provides vocal and music notation lessons, enhancing the user's auditory and cognitive development.

10 Claims, 13 Drawing Sheets

ACOUSTIC INSTRUMENT SOOTHER WITH VOCAL AND MUSIC NOTATION LESSONS

CROSS-REFERENCE TO RELATED APPLICATIONS

This application claims the priority date of provisional patent application No. 63/449,042 filed on Feb. 28, 2023. The application is incorporated herein by reference in its entirely.

FIELD OF THE INVENTION

The present invention relates in general to musical instruments combined with pacifying devices and teething devices for infants and youths and in more specific to a sound generating pacifier which directly generates sound to amuse an infant upon the infant expelling air into a sound generating means.

BACKGROUND OF THE INVENTION

Pacifiers and teething devices are available which are used to calm and soothe an infant, but few contain non-electronic musical elements. Various types of pacifiers for an infant's mouth have been proposed in the prior art for pacifying infants.

Other prior art pacifiers have included some type of sound generating means for entertaining infants. Prior art musical pacifiers have utilized an electronic circuit to produce audible sound when the infant slightly compresses the nipple portion. The problem with this type of prior art pacifier is that it requires a battery to power the electronic circuit which produces the audible sounds. Some small batteries may be toxic, if the infant by chance swallows the battery. Another problem with this type of prior art pacifier is that the musical generating portion of the pacifier must be detached from the nipple portion to enable the nipple portion to be sterilized. This creates cleaning problems as well as the potential that the two parts of the pacifier could separate while being used by the infant.

SUMMARY OF THE INVENTION

The present invention introduces a novel acoustic instrument soother tailored for infants and young children, combining a pacifier, a teether, and a mouthguard with a harmonica to generate sound. Unlike traditional pacifiers, this device incorporates non-electronic musical elements, aiming to soothe and entertain young users while fostering early musical education. The harmonica component features multiple mouthpieces for sound production, activated by the user's inhalation and exhalation. Through the integration of music notation symbols engraved on its surface, the device provides vocal and music notation lessons, enhancing the user's auditory and cognitive development. Crafted from chewable materials, the pacifier, teether, and mouthguard ensure safe usage while allowing infants to engage in musical exploration. By encouraging creativity and offering an interactive learning experience, the invention promotes an early interest in music and aids in speech development. Notably, the device operates without the need for batteries or electronic components, eliminating potential safety concerns associated with traditional musical pacifiers.

The main feature of the present invention is to introduce acoustic music to infants, making them the musicians by providing music notation lessons, vocal lessons while sucking the pacifier or chewing the teether. As the user inhales or exhales air into the mouthpieces, air-flow vibrates the harmonica reeds, creating a sound. Different size reeds create different sounds; longer reeds produce lower pitched sounds while shorter reeds produce higher pitched sounds. Musical sounds are created when the user forcefully blows air into the mouthpiece holes. Sounds are produced when air from the user's breath passes over the reeds, causing it to vibrate. Therefore, the present invention aids in children learning how to speak, as it requires forced breath to activate the musical sounds, the device is designed to be used when speech among infants commonly begins, at or about 12-months-old.

The device comprises of multiple mouthpiece. Each mouthpiece, when air is blown into it, produces the sound of a musical note. Each mouthpiece makes a distinctly different sound. On the outer surface or teething area of the device, musical notation symbols are engraved or protruded with numeric and alphabetical labelling, representing different values for each symbol. Note timing values, note rest values, note names, and a vocal scale are engraved on the outer shell of the device to provide music lessons for the user. The user can learn the name of the note they are playing as the note name is located near or above the mouthpiece of that note. Engraved and protruding note names, symbols, values and alphabetical labelling also act as teething grooves for the user when they chew on the device.

The present invention encourages creativity among young users and is ideal for developing an early interest in music amongst users. The present invention lets a user convert the pacifier and the teether into a harmonica by changing how they handle and interact with the device. The device can be used as a pacifier or for users who are teething, or for calming an infant or child who has or might not have teeth. To function as a harmonica, the user inhales or exhales air through the mouthpieces.

The note location on a music staff is located above the note name and the vocal scale Do-Re-Mi-Fa-So-La-Ti-Do is located above the corresponding note name, so the user can learn how to sing by matching their voice pitch to the note sound. Some variations of the present invention may include reeds placed in an alternate direction, so that a user may inhale air to activate musical sounds. Some variations of the present invention may embody inhale reeds and exhale reeds stacked, so that multiple notes are produced by a user inhaling and exhaling.

The present invention can be used by users of all ages but is especially designed for infants and young children. Therefore, it is the primary objective of the invention to introduce musical instruments to users less than three years of age, though users of all ages can enjoy the device.

It is another object of the present invention to provide a pacifier and teether in combination with a music instrument designed to introduce acoustic music to infants and young children.

It is another object of the present invention to teach children music notation lessons, as well as vocal lessons while they chew as they are teething or sucking the pacifier or are interacting with the instrument.

It is another object of the present invention to aid in children learning how to speak at or about 12-months-old, when speech among infants commonly begins, as it requires forced breath to activate the musical sounds.

It is another object of the present invention to provide a sound generating pacifier or teething device for an infant's mouth that does not require any batteries or electronic means in order to generate sounds.

BRIEF DESCRIPTION OF DRAWINGS

Embodiments herein will hereinafter be described in conjunction with the appended drawings provided to illustrate and not to limit the scope of the claims, wherein like designations denote like elements, and in which:

DETAILED DESCRIPTION OF THE INVENTION

Figure 1:
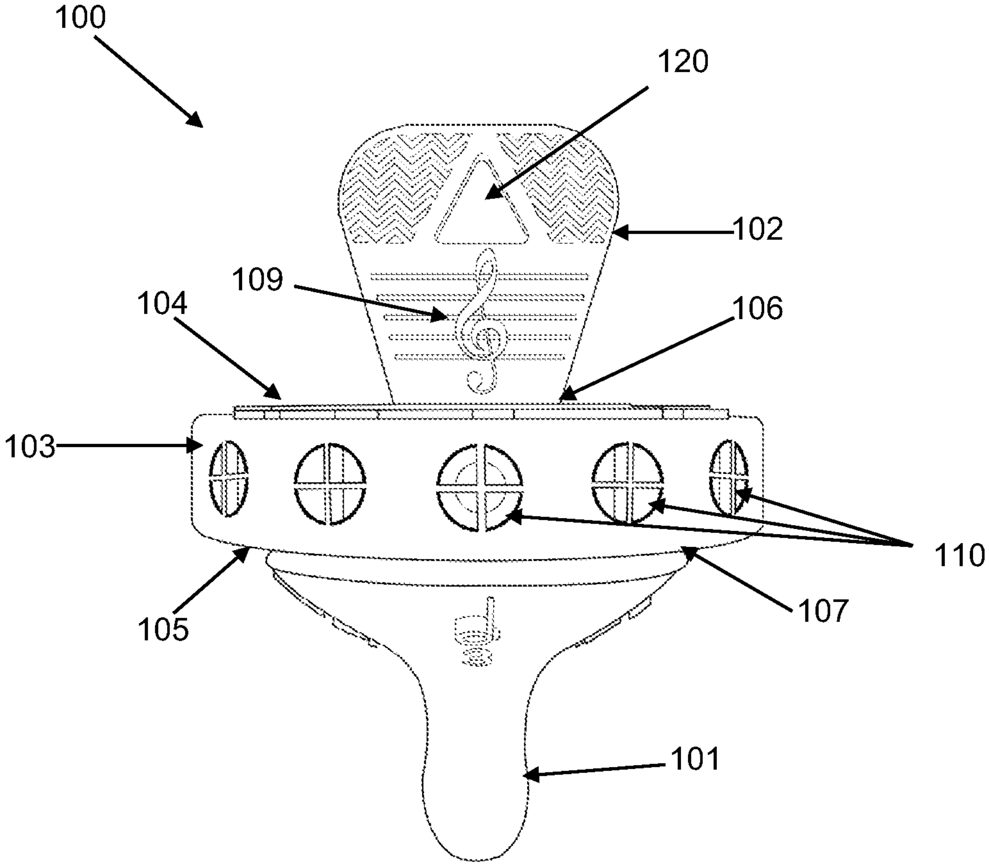
FIG. 1 illustrates the present invention embedding a teether, a pacifier and a mouthguard which embodies a harmonica.
Figure 2:
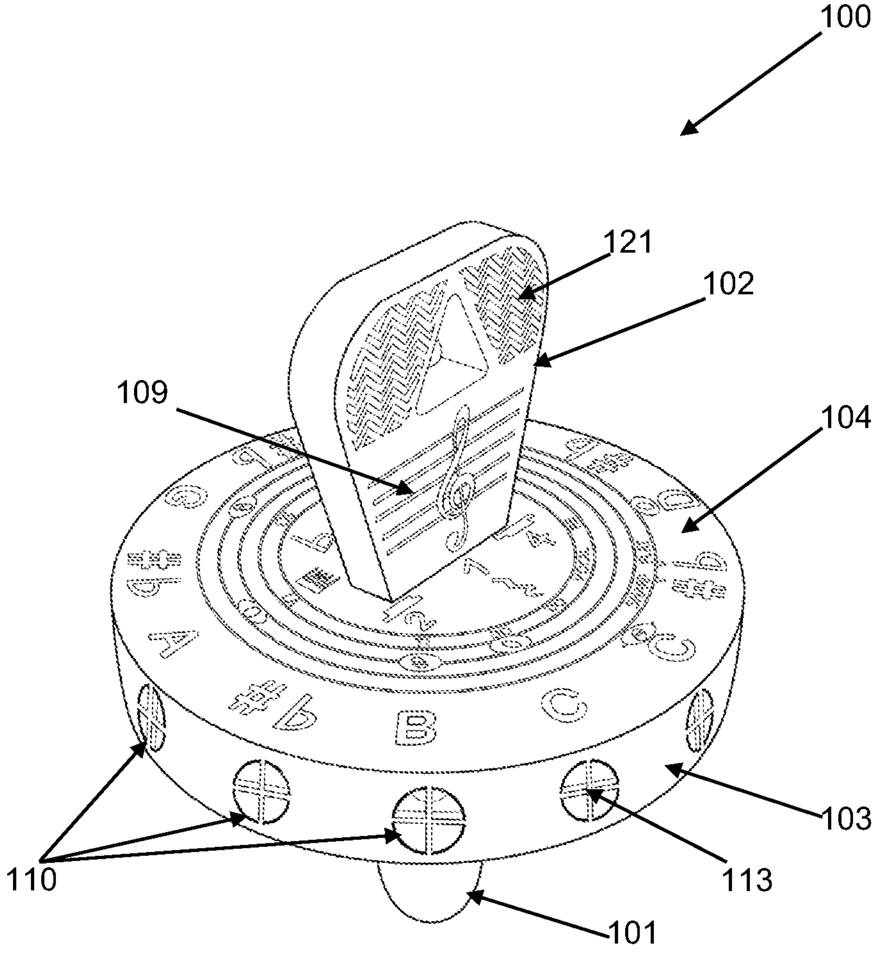
FIG. 2 illustrates the present invention showing the teether and the mouthguard with the note name located near or above the mouthpiece of the mouthguard.

As shown in FIGS. 1 and 2, the device 100 comprises a pacifier 101, a teether 102 and an annular mouthguard 103. The mouthguard 103 divides the device 100 into distinct zones: the teething area and the pacifier area. The mouthguard 103 features a top portion 104 and a bottom portion 105 that are configured in such a way as to form an enclosed interior space, thereby creating a volume within the structure. This volume is specifically designed to accommodate the insertion and secure embedding of harmonica instrument. The teether 102 is attached to the top portion 104 from its distal end 106 and the pacifier 101 is attached to the bottom portion 105 from its distal end 107.

The device 100 can be used as a pacifier and teether to calm and soothe an infant. The teether further has grooves 121 for teething and can be used for users who are teething, or for calming infant or child who has or might not have teeth. The device has an aperture 120 constructed on the teething area for a strap.

The mouth guard 103 incorporates a harmonica (not shown) featuring multiple mouthpieces 110 through which the user exhales or inhales air to generate musical tones. Each mouthpiece 110, upon air passage, emits a distinct musical note. Notably, each mouthpiece 110 yields a unique auditory output, collectively contributing to the harmonica's diverse tonal range and expressive capabilities. The harmonica is embedded inside the mouthguard 103.

The user has the option to engage with the teether 102 by chewing on it or utilize the pacifier 101 or teether 102 for sucking purposes. Notably, the mouthguard 103 is further constructed from a chewable material, enabling the user to safely chew while concurrently enjoying musical activities, without risk of gum or tooth injury. Additionally, the teether 102 of the device serves as a handle, affording the user a comfortable grip when holding the device 100. The teether 102 further includes musical engravings and protruding 109 thereon. The mouthpieces 110 may have protective guards 113 to prevent a user's finger from getting stuck.

Figure 3:
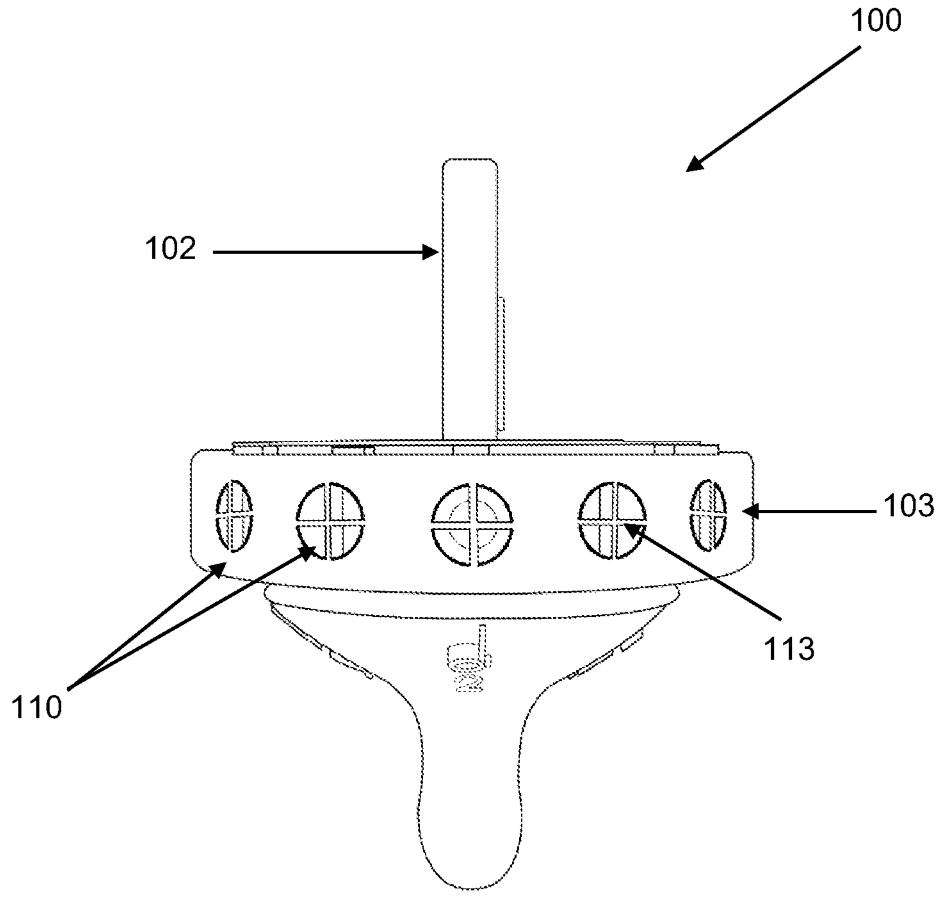
FIG. 3 illustrates the present invention showing a side view thereof.
Figure 4:
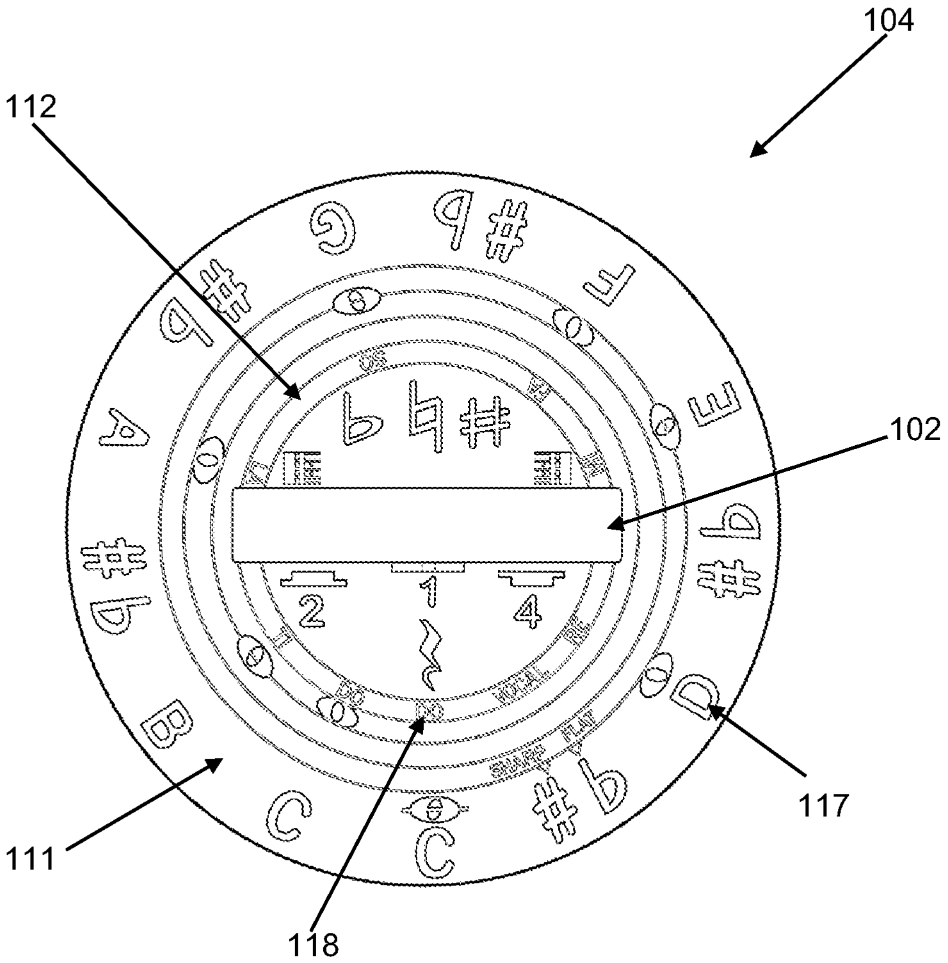
FIG. 4 illustrates the teether of the present invention with musical notation symbols, alphabetical note names and vocal lessons engraved/protruded on the teething area.

As depicted in FIG. 3 the mouthpieces exhibit diverse geometries. The mouthpieces 110 are designed all around the mouthguard 103. Through these mouthpieces 110 integrated within the mouthguard 103 housing a harmonica, the user can manipulate airflow, facilitating both inhalation and exhalation. This action induces sound production by vibrating the corresponding reeds of the harmonica, thereby allowing for musical expression.

According to FIG. 2 again and 4 musical notation symbols, accompanied by numeric and alphabetical labeling, are meticulously engraved or protruded onto the surface of the top portion 104, specifically the teething area of the device. The top portion 104 acts as a music display. In the preferred embodiment, it consists of a first circular surface 111 and second circular surface 112 as a faceplate member. The symbols correspond to distinct values, with each symbol engraved above its respective mouthpiece 110, which surrounds the mouthguard 103. Each mouthpiece 110 is uniquely designed to emit a sound corresponding to the symbol engraved at top of it. Furthermore, the surface of the top portion 104 of the device features engravings and protrusions of timing values, note rest values, note names, and a vocal scale, thereby facilitating music instruction for the user. By referencing the note names located near or above each mouthpiece 110, users can readily identify the notes they play.

In the accompanying illustration, the notes' positions on a musical staff align with their respective names, enhancing clarity. The Note Names (C, D, E, F, G, A, B, C) 117 are engraved or protruded above corresponding note mouthpiece on the first plantar surface 111. The vocal scale, "Do-Re-Mi-Fa-So-La-Ti-Do,"118 is positioned above the corresponding note names on the second plantar surface 112 enabling users to learn vocalization alongside instrumental proficiency by matching their vocal pitch with the correct harmonica note. The present invention provides basic music lessons for young children. They will learn the following symbols which are engraved on the device:

i. The Note Names (C, D, E, F, G, A, B, C) engraved above corresponding note mouthpiece;
ii. Note Sharp Symbol (C♯, D♯, F♯, G♯, A♯) engraved above corresponding note mouthpiece;
iii. Note Flat Symbol (D♭, E♭, G♭, A♭, B♭) engraved above corresponding note mouthpiece;
iv. Note Symbol (how note looks on a music sheet) is engraved above corresponding note mouthpiece;
V. Do-Re-Mi-Fa-So-La-Ti-Do singing lesson engraved above corresponding note mouthpiece [ex: Do=C, Re=D, Mi=E, Fa=F, So=G, La=A, Ti=B, Do=C];
vi. Rest Timing Values (Quarter rest=1 beat, half rest=2 beats, whole rest=4 beats) engraved.

Figure 5:
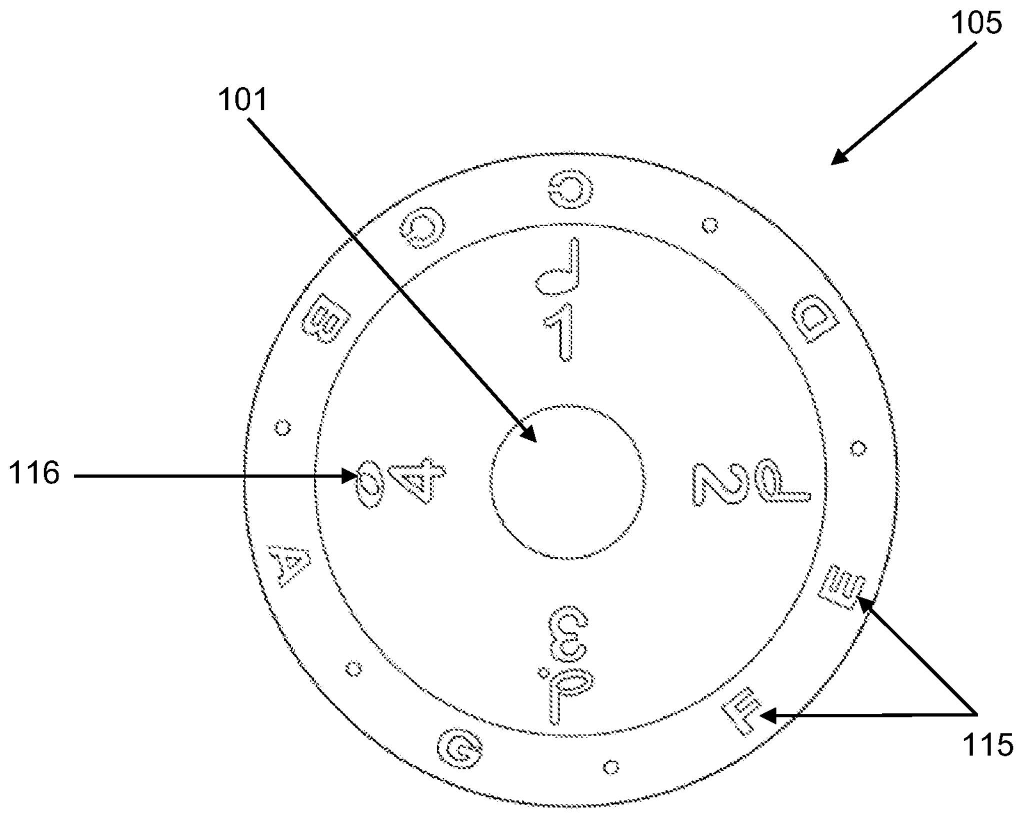
FIG. 5 illustrates the pacifier of the present invention with musical notation symbols engraved/protruded on the pacifier area.

FIG. 5 shows a top plan view of the pacifier area of the device. The pacifier area further provides the note timing symbols (Quarter note=1 beat, half note=2 beats, dotted-half note=3 beats, whole note=4 beats) engraved or protruded and the note names. The note names 115 are engraved or protruded on the surface of the bottom portion 105 of the mouthguard and the Note Timing Symbols 116 are engraved or protruded on the pacifier 101 of the device.

Musical sounds are created when the user forcefully blows air into the mouthpieces 110. Sounds are produced when air from the user's breath passes over the reeds of the harmonica, causing the reeds to vibrate inside the mouthguard and makes sound.

Some variations of the present invention may include reeds placed in an alternate direction, so that a user may inhale air to activate musical sounds. Some variations of the present invention may embody inhale reeds and exhale reeds stacked, so that multiple notes are produced by a user inhaling and exhaling. Each reed produces a different sound depending on its length and width.

Figure 6:
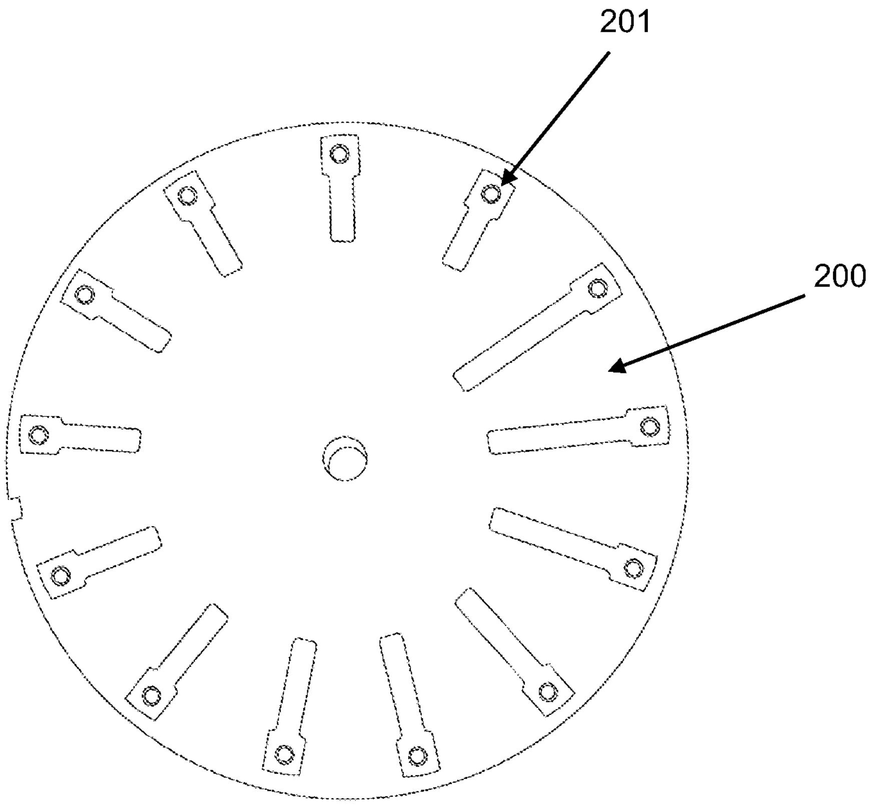
FIG. 6 illustrates an embodiment of the harmonica reeds arrangement, according to the present invention.
Figure 7:
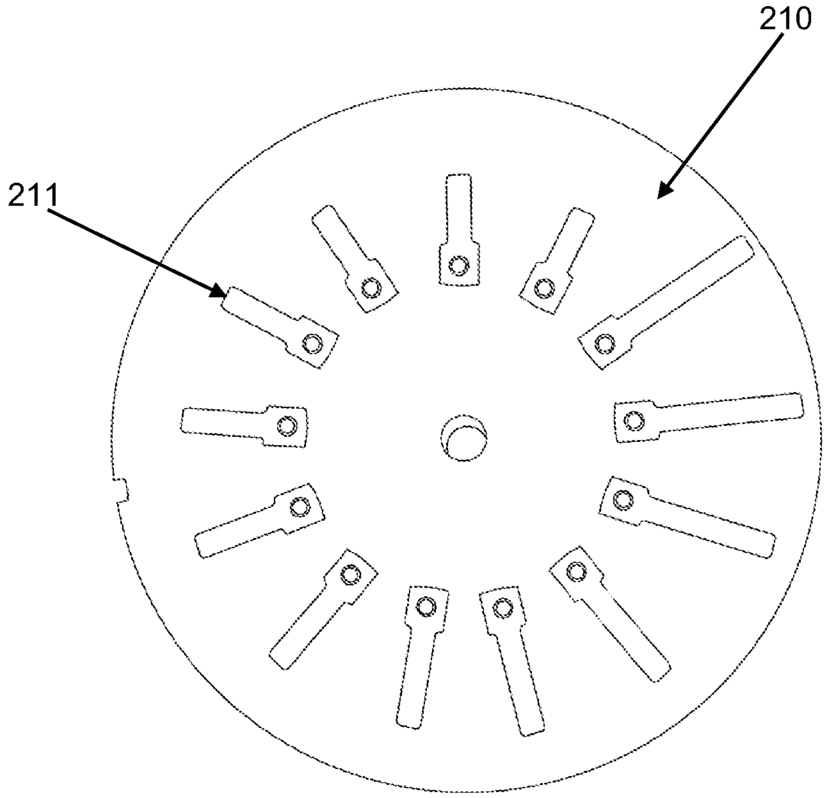
FIG. 7 illustrates another embodiment of the harmonica reeds arrangement, according to the present invention.

FIGS. 6 to 10B show the harmonica instrument 150 of the invention embedded inside the mouthguard 103. FIGS. 6 and 7 are a top view of the reed plates 200 and 210 of the harmonica. The invention may include both an inhale and exhale reed variation in one harmonica. 1 or 2 layers of harmonica reed plates can be designed in the invention. The harmonica 150 can be used by exhaling or inhaling. For exhaling and inhaling, the reeds need to be arranged in the shown order. Reeds can be activated by inhaling or exhaling air through the mouthpieces. By inhaling air, or drawing air, reeds facing corresponding direction will vibrate. By exhaling air, or blowing air, reeds facing corresponding direction will vibrate.

According to FIG. 6, the harmonica reeds 201 are arranged to be used by exhaling into the mouthpiece 110, activating the exhale reeds 201. In the preferred embodiment depicted in this invention the harmonica comprises, in part, an annular reed plate 200 consisting of one or more series of exhale reeds 201 which are secured to the reed plate 200 by securing means being a screw 212. The exhale reeds are attached throughout the circumference of the interior wall 200 and activate by exhaling into the mouthpieces and vibrate near the middle of the device. The mouth pieces 110 around the mouth guard 103 form channels of the instrument so that certain of the exhale reeds 201 may be sounded by forcing a current of air into the corresponding channels. The longest reeds are the low notes and the shortest reeds are the high notes.

FIG. 7 shows the harmonica reeds arranged to be used by inhaling into the mouthpiece 110, activating the inhale reeds 211. In another layer an annular plate 210 consists of one or more series of inhale reeds 211. The inhale reeds 211 are arranged around the center of the annular plate 210 and activate by inhaling air from the mouthpieces and the reeds vibrate near the mouthpieces 110. The mouth pieces 110 around the mouth guard 103 form channels of the instrument so that certain of the inhale reeds 211 may be sounded by suction a current of air from the corresponding channels.

Figure 8:
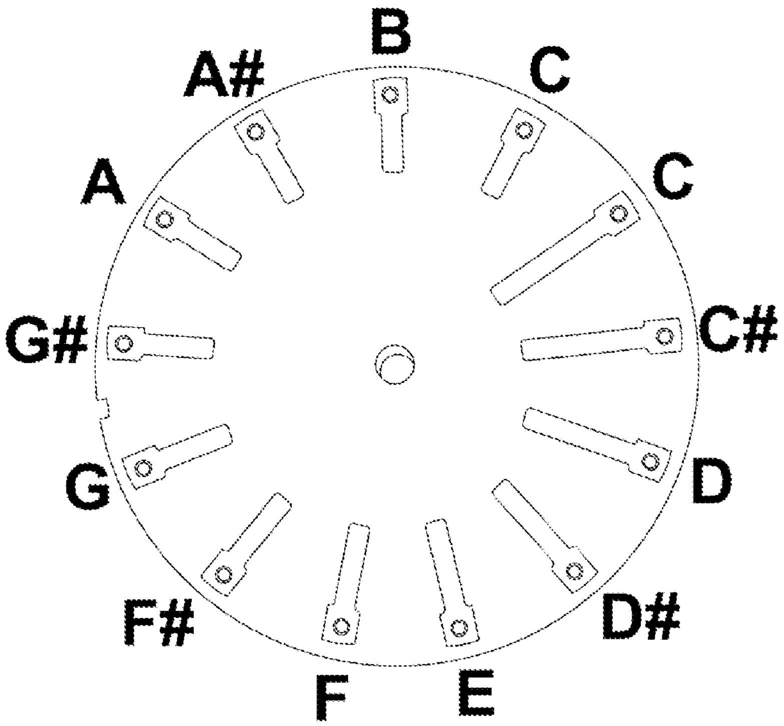
FIG. 8 illustrates an exemplary arrangement of the notes, according to the present invention.

An exemplary arrangement of the notes are shown in FIG. 8. In music terms, this is a C to C harmonica, meaning C D E F G A B C, and their sharp and flat note variations, are found in this musical scale. There may also be A to A variations, B to B variations, D to D variations, E to E variations, F to F variations, and G to G, etc. It is to be understood that these keys are arbitrary names, any other combination of keys and number of different keys may be provided within the limit of the circumference size of the instrument.

Reeds 201-211 are aligned in such a way that they make sounds when air passes over them in a particular direction. Reeds 201-211 are a narrow piece of metal, copper, wood, plastic, or bamboo that are arranged at such an angle that when air passes through in the appropriate direction, it vibrates the reeds 201-211, creating a sound. Various sounding notes are achieved based on the length of the reed 201-211. Long reeds make lower pitched sounds while shorter reeds make higher pitched sounds.

Figure 9:
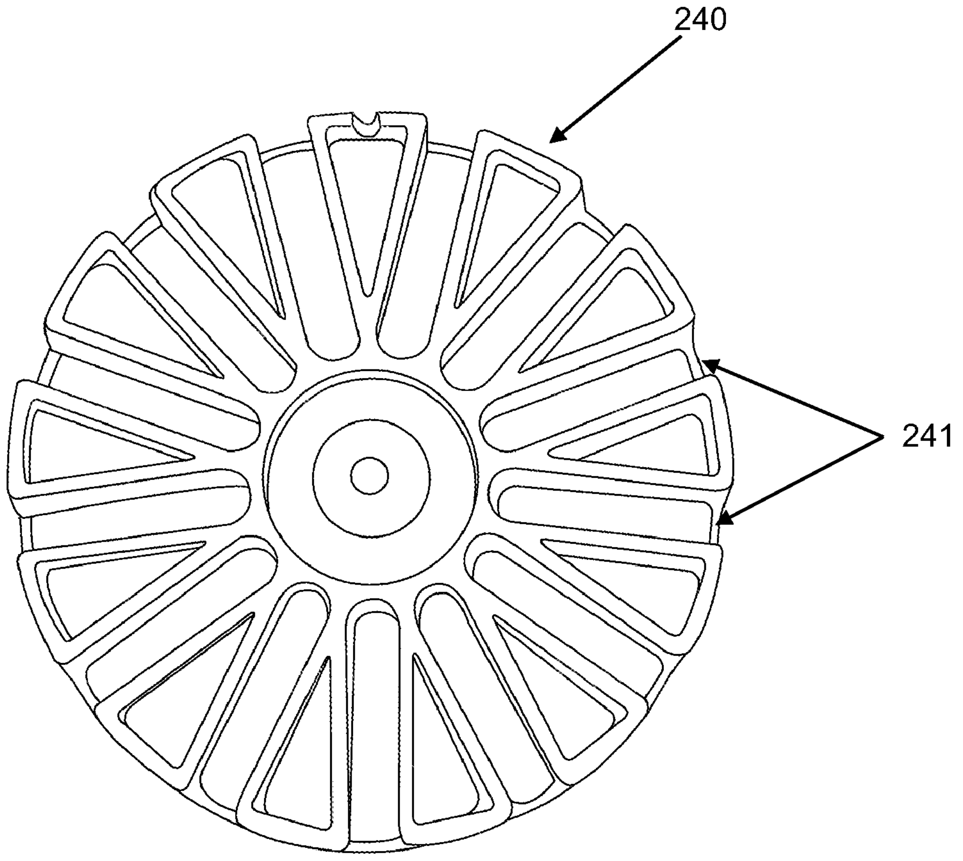
FIG. 9 illustrates the internal design of the mouthpiece showing the bottom portion of the harmonica, according to the present invention.
Figure 10A:
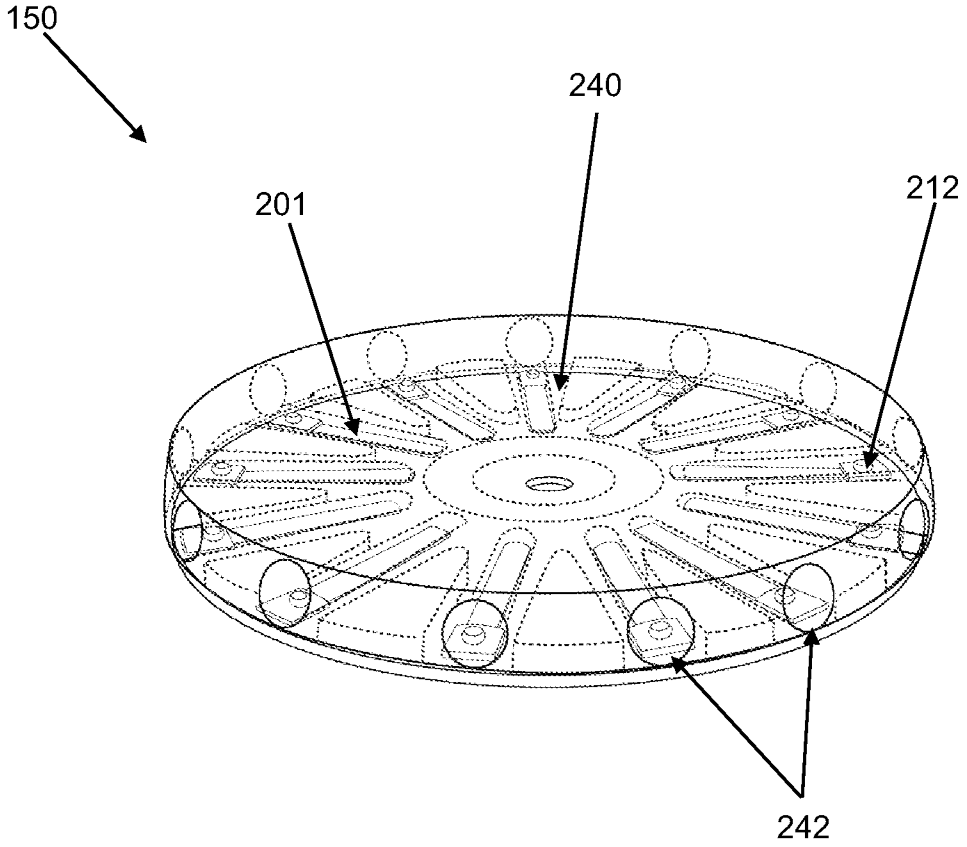
FIG. 10 A illustrates the harmonica embedded inside a silicone cover, according to the present invention.
FIG. 10B illustrates an exploded view of the harmonica embedded inside the mouthguard, according to the present invention.
Figure 10B:
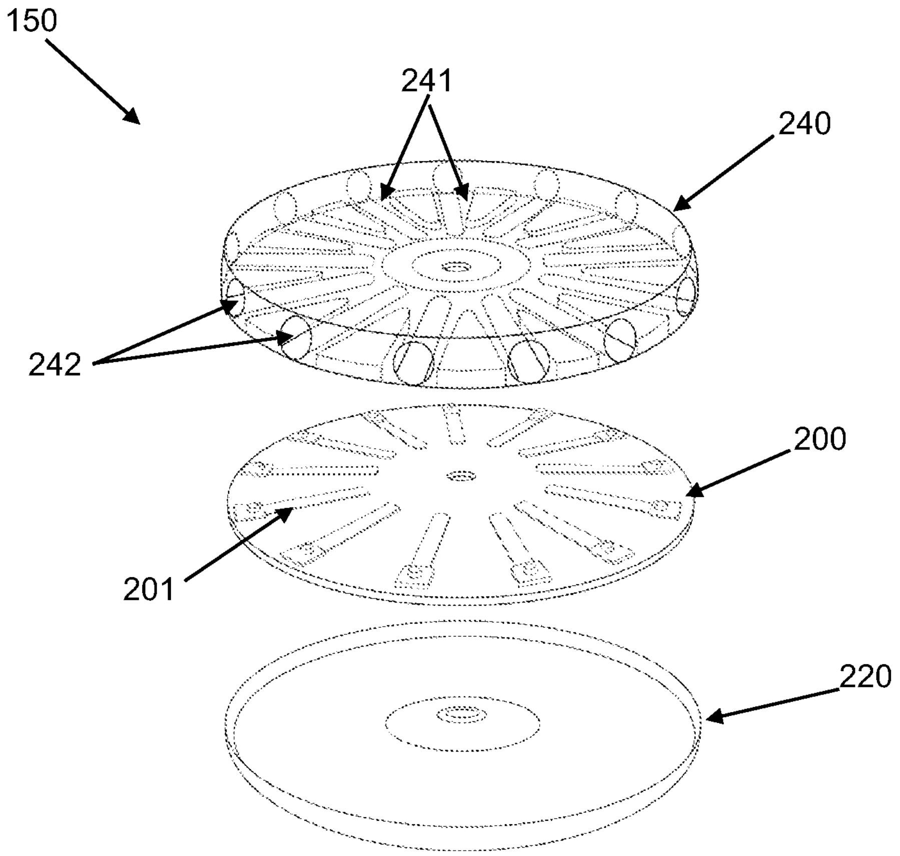

FIGS. 9, 10A and 10B illustrate the internal design of the mouthguard showing the harmonica 150 of the device which is embedded inside the mouthguard 103. The harmonica 150 features a top portion 220 and a bottom portion 240 and a reed plate 200 in between the top portion 220 and the bottom portion 240. The bottom portion 240 is a plastic layer with a plurality of air channels 242 designed thereon and formed with a series of openings 242 which align with the mouth pieces 110 of the mouthguard 103. The air channels 241 direct the air into the instrument forcing a current of air into the corresponding air channels 242. The top plate 220 is a flat metal plate. It is to be understood that an air chamber is formed between the layers. The harmonica is embedded inside the mouthguard 103.

The outer shell of the device comprising the teether 102, the pacifier 101, the mouthguard and the mouth pieces are made of soft materials such as rubber and silicone. Silicone material that is compatible with medical-grade and food-grade silicone is more suitable, since it is soft and chewy due to its rubbery feel. It can soothe the gums and remains durable for a long time. The inner harmonica instrument is made of plastic, metals and brass. The present invention requires no batteries or electronics to operate. These makes the device 100 a suitable toy for young children and will not harm a child if they chew the device 100.

Figure 11:
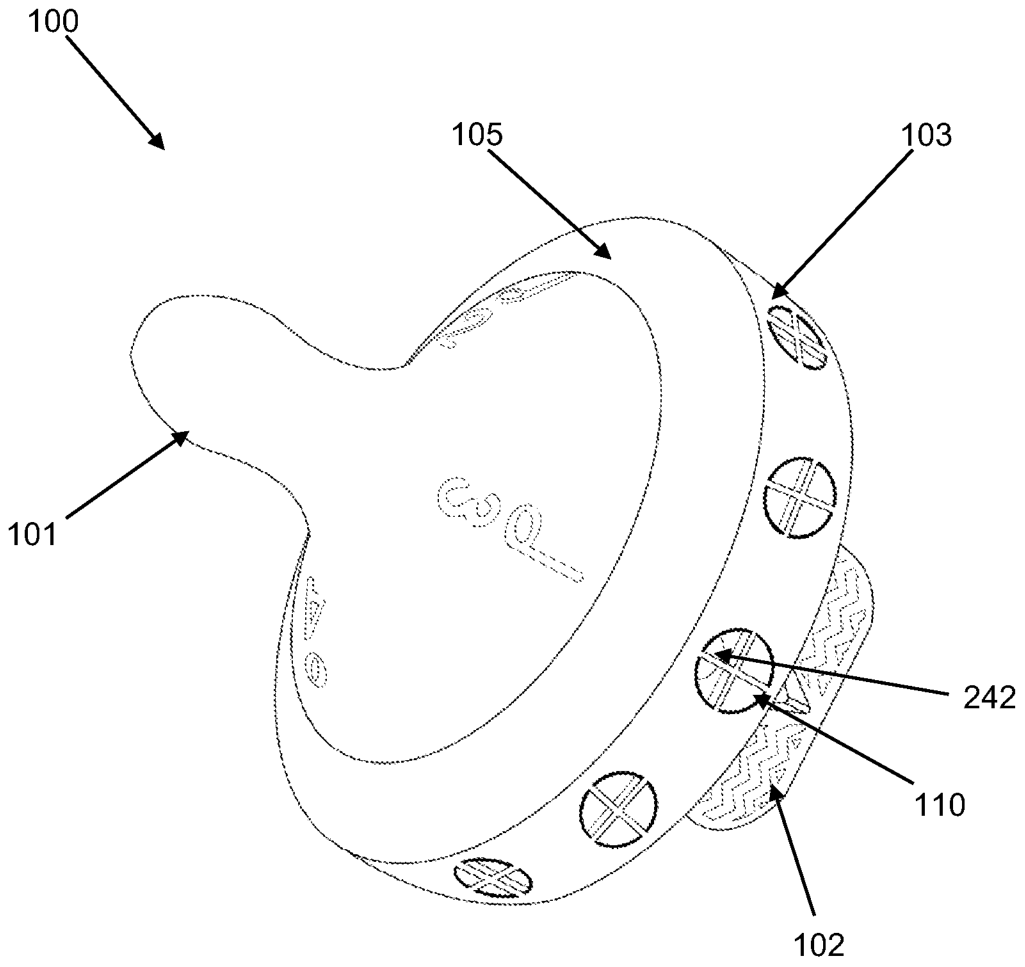
FIG. 11 illustrates the present invention showing the pacifier of the present invention.
Figure 12:
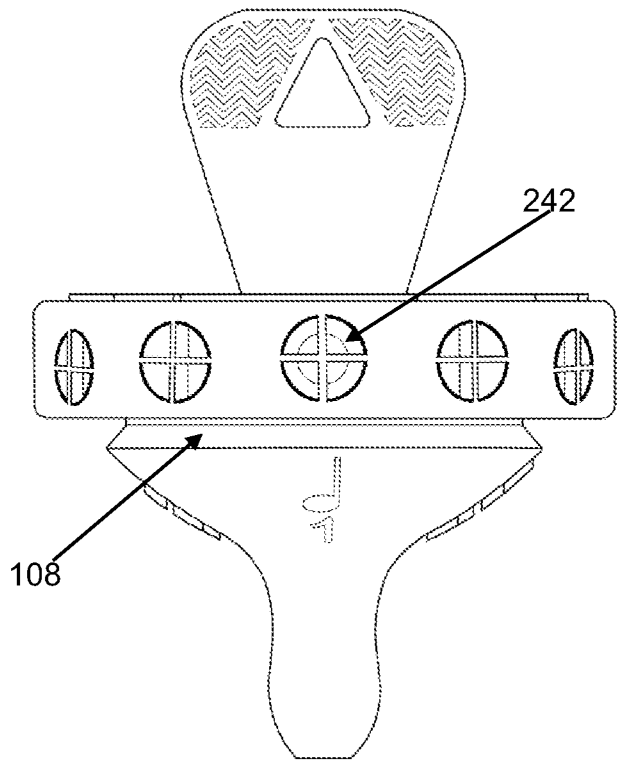
FIG. 12 illustrates a rear view of the present invention.

According to FIGS. 11 and 12 the pacifier 101 is attached to the bottom portion 105 from its distal end 107 and provides a groove on the connection part 108 which allows the pacifier 101 to be more flexible to calm and soothe an infant. The pacifier 101 has a pocket of air therein. The harmonica is embedded inside the mouthguard 103. The openings of the harmonica 242 align with the mouth pieces 110 of the mouthguard 103. The air channels direct the air into the instrument forcing a current of air into the corresponding air channels.

The present invention is designed to introduce acoustic music to infants, making them the musician or sound maker; while providing music notation lessons, vocal lessons, while using as a toy to chew as they are teething or calming. The present invention will also aid in children learning how to speak, as it requires forced breath to activate the musical sounds and can be used when speech among infants commonly begins, at or about 12-months-old.

In another embodiment, LED lights and luminescent materials may be incorporated into the device to provide assistance to users in learning to play the harmonica. This feature illuminates specific notes, facilitating the learning process. LED lights can be powered either by internal batteries or by harnessing energy from the user's breath, eliminating the need for a separate power source. The present invention represents an acoustic instrument designed to introduce infants and young children to acoustic music by empowering them to engage as musicians themselves.

In another embodiment the device 100 further has the ability to communicate with an external smartphone or tablet or computer using a microphone of the smartphone or tablet or computer in combination with a software.

Although this invention has been described in its preferred form, it is understood that the present disclosure of the preferred form has been made only by way of example and that numerous changes in the details of construction and the combination and arrangement of parts may be resorted to without departing from the spirit and scope of the invention.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

With respect to the above description, it is to be realized that the optimum relationships for the parts of the invention in regard to size, shape, form, materials, function and manner of operation, assembly and use are deemed readily apparent and obvious to those skilled in the art, and all equivalent relationships to those illustrated in the drawings and described in the specification are intended to be encompassed by the present invention.

What is claimed is:

1. A musical instrument soother comprising:

a) a mouthguard having a body, said body having a top-surface, a bottom-surface and a thickness forming an interior space to accommodate a harmonica;

b) a teether attached to the top-surface and c) a pacifier attached to the bottom-surface;

d) the harmonica comprises of i) at least a reed plate consisting of a plurality of reeds which are secured to the reed plate, ii) a series of mouthpieces arranged around the mouthguard forming air channels responsive to a passage of air to produce a musical note, wherein each one of the plurality of reeds produces sounds by forcing an airflow into the corresponding air channel or by suction of air through the corresponding air channel;

e) a series of musical notation symbols, accompanied by numeric and alphabetical labeling engraved onto the top-surface and the bottom-surface, wherein each symbol positioned above its respective mouthpiece;

f) a Do-Re-Mi-Fa-So-La-Ti-Do vocal lesson above the corresponding mouthpiece, allowing the user to match their voice pitch with the correct note sound, whereby the musical instrument soother provides vocal and music notation lessons in combination with the pacifier and the teether for calming an infant or child and further to introduce acoustic music notation lessons while helping children learn how to control their breath and develop their speaking and singing voice.

2. The musical instrument soother of claim 1, wherein the reed plate comprising a first reed plate and a second reed plate and wherein a plurality of exhale reeds are arranged throughout the body of the first reed plate and activated by exhaling into the series of mouthpieces and a plurality of inhale reeds are arranged around a second reed plate and activated by inhaling air which draws air as it goes into a selected mouthpiece, while air enters the user's mouth.

3. The musical instrument soother of claim 1, wherein the teether has an aperture for a strap.

4. The musical instrument soother of claim 1, wherein each mouthpiece is uniquely designed to emit a musical note sound corresponding to the symbol engraved at a top of the mouthpiece.

5. The musical instrument soother of claim 1, wherein said soother is made of safe silicone material that is compatible with medical-grade silicon and is soft and chewy and rigid, in selected areas.

6. The musical instrument soother of claim 1, wherein the harmonica is made of plastic, metal and metal alloys including but not limited to brass, copper and stainless steel.

7. The musical instrument soother of claim 1, further has a handle for holding the musical instrument soother, wherein the handle is the teether and wherein the teether embodies musical symbols.

8. The musical instrument of claim 1, further having engraved and protruding teething grooves in the shape of musical note, notation, rest, timing and vocal lessons.

9. The musical instrument of claim 1, wherein the pacifier has various shapes and sizes configured to calm and soothe the user.

10. The musical instrument of claim 1, further having the ability to communicate with an external smartphone or tablet or computer using a microphone of the smartphone or tablet or computer in combination with a software.

* * * * *